United States Patent
Shlick et al.

(10) Patent No.: US 8,443,260 B2
(45) Date of Patent: May 14, 2013

(54) ERROR CORRECTION IN COPY BACK MEMORY OPERATIONS

(75) Inventors: Mark Shlick, Ganei Tikva (IL); Mark Murin, Kfar-Saba (IL); Menahem Lasser, Kochav Yair (IL)

(73) Assignee: Sandisk IL Ltd., Kfar Saba (IL)

( * ) Notice: Subject to any disclaimer, the term of this patent is extended or adjusted under 35 U.S.C. 154(b) by 1234 days.

(21) Appl. No.: 12/005,368

(22) Filed: Dec. 27, 2007

(65) Prior Publication Data

US 2009/0172498 A1 Jul. 2, 2009

(51) Int. Cl.
*G11C 29/42* (2006.01)
*G11C 29/54* (2006.01)

(52) U.S. Cl.
USPC .......................................... 714/764; 714/758

(58) Field of Classification Search ........................ None
See application file for complete search history.

(56) References Cited

U.S. PATENT DOCUMENTS

| | | | |
|---|---|---|---|
| 4,323,968 A * | 4/1982 | Capozzi | 714/52 |
| 5,671,388 A | 9/1997 | Hasburn | |
| 5,930,167 A | 7/1999 | Lee et al. | |
| RE36,732 E | 6/2000 | Miyamoto | |
| 6,122,193 A * | 9/2000 | Shibata et al. | 365/185.03 |
| 6,522,580 B2 | 2/2003 | Chen et al. | |
| 6,678,785 B2 | 1/2004 | Lasser | |
| 7,149,111 B2 | 12/2006 | Murin et al. | |
| 7,779,341 B2 | 8/2010 | Kim | |
| 2005/0071592 A1 | 3/2005 | DeCaro | |
| 2005/0195635 A1 | 9/2005 | Conley et al. | |
| 2005/0289314 A1 | 12/2005 | Adusumilli et al. | |
| 2006/0050576 A1 | 3/2006 | Kim | |
| 2007/0186040 A1 * | 8/2007 | Kasahara et al. | 711/115 |
| 2007/0239927 A1 | 10/2007 | Rogers et al. | |
| 2007/0283081 A1 | 12/2007 | Lasser | |
| 2008/0172518 A1 | 7/2008 | Shmulevich et al. | |
| 2008/0209114 A1 | 8/2008 | Chow et al. | |
| 2008/0244164 A1 | 10/2008 | Chang et al. | |

(Continued)

FOREIGN PATENT DOCUMENTS

EP 1465203 10/2004
WO WO 2009/083954 7/2009

OTHER PUBLICATIONS

Official Action Dated May 24, 2011 From the US Patent and Trademark Office Re. U.S. Appl. No. 12/214,291.

(Continued)

*Primary Examiner* — Ajay Bhatia
*Assistant Examiner* — Dipakkumar Gandhi
(74) *Attorney, Agent, or Firm* — Toler Law Group, PC

(57) ABSTRACT

A method of storage and retrieval of data in a flash memory system, the flash memory system comprising a cache storage area of relatively high reliability, and a main storage area of relatively low reliability, the method comprising adding to data a level of error correction redundancy higher by a predetermined margin than that required for the cache storage area, writing the data to the cache storage area, and from the cache storage area copying the data directly to the main storage area, the predetermined margin being such as to allow subsequent error correction to compensate for errors accumulated from the cache storage area and the main storage area. In this way the memory die copy back operation can be used for copying the data from the cache to the main memory and two out of four transfers over the data bus to the flash controller are avoided.

14 Claims, 4 Drawing Sheets

U.S. PATENT DOCUMENTS

2009/0125643 A1    5/2009    Prevost et al.
2009/0259799 A1   10/2009    Wong
2009/0276562 A1   11/2009    Lieber

OTHER PUBLICATIONS

International Preliminary Report on Patentability Dated Jul. 8, 2010 From the International Bureau of WIPO Re. Application No. PCT/IL2008/001632.
International Search Report Dated Jun. 3, 2009 From the International Searching Authority Re.: Application No. PCT/IL2008/001632.
Written Opinion Dated Jun. 3, 2009 From the International Searching Authority Re.: Application No. PCT/IL2008/001632.
Response Dated Mar. 10, 2011 to Official Action of Dec. 14, 2010 From the US Patent and Trademark Office Re. U.S. Appl. No. 12/214,291.
Official Action Dated Dec. 14, 2010 From the US Patent and Trademark Office Re. U.S. Appl. No. 12/214,291.
Official Action Dated Dec. 9, 2011 From the US Patent and Trademark Office Re. U.S. Appl. No. 12/214,291.
Response Dated Sep. 20, 2011 to Official Action of May 24, 2011 From the US Patent and Trademark Office Re. U.S. Appl. No. 12/214,291.
Final Office Action mailed Aug. 20, 2012 in U.S. Appl. No. 12/214,291, 17 pages.

* cited by examiner

ERROR CORRECTION IN COPY BACK MEMORY OPERATIONS

FIELD AND BACKGROUND OF THE INVENTION

The present invention, in some embodiments thereof, relates to error correction in copy back memory operations and, more particularly, but not exclusively, to flash and like memory devices where copy back operations are common and wherein error correction is desirable to avoid accumulation of errors over a series of copy back operations.

Copy-back is the operation in which a page of data is copied from a first physical address to a second physical address, but without sending the data out of the flash die. Page copying operations are quite common in flash management systems, for example when doing garbage collection and moving a page of still-valid user data to a new location. Many flash dies on the market support commands for doing a copy-back operation—moving the data between two physical locations without spending time on sending the data out of the flash die. One would expect that flash management systems that manage flash devices having such capability would use the flash die's internal copy back operation for doing their garbage collection data movement. However, in most flash management systems this is not the case, and page copy operations are typically carried out by the following steps:

a. Reading the data from the original physical page in the flash array into the flash die data register b. Moving the data out of the flash die over the bus connecting the flash die and the flash controller c. Checking the data for errors, and correcting the errors if necessary d. If correction was necessary, sending the corrected data from the controller over the bus to the flash die data register e. Programming the data from the data register into the flash array.

The above procedure is inefficient and wastes much time. In particular it takes up precious bus cycles by moving the data over the controller-flash bus. The reason for doing the data copying in such a non efficient way is the problem of the accumulation of errors. Whenever reading a page of data from a flash dye, one must be aware of the possibility of errors accumulated in the data since it was programmed.

For this reason user data stored in a flash page is accompanied by error correction parity bits that allow the correction of errors once detected to occur. When copying a page according to the above procedure of steps a-e, any errors accumulated in the original location of the data are corrected in step "c" and the data is reset again to its originally correct version. However, if the die's internal copy-back method is used for copying the data, no error correction occurs. If it so happens that the copied data has already accumulated errors prior to being copied, then the version of the data in the new location starts its life with those errors included. Later, when the data is moved again by the flash management software, the process repeats itself—the data now contains both the errors with which it was first programmed as well as any new errors that might have accumulated in the second location. There is no limit to this accumulation of errors as long as the data remains valid, that is, the data is not deleted or over-written. At some point the number of errors may exceed the capability of the error correction mechanism to correct them, at which point the data becomes corrupted and may be lost for its owner.

The consequence of the above is that relying on internal die copy-back operations when moving data between physical locations within the flash array is dangerous and may end up with irretrievable data loss. This is the reason flash management systems usually do not utilize the internal copy-back option.

It would thus be beneficial if one could find a way of taking advantage of die internal copy-back capability during flash management data copying in a way that provides the inherent time saving of copy-back but without risking reliability and integrity of the data.

We note that the above discussion ignores the problem of control fields associated with user data and stored with it in the same page. Such control fields sometimes depend on the exact physical address of the data and therefore change when the data is moved between two physical addresses. This complication means that in such flash management systems a simple copy-back implementation of the data move is impossible not only because of the accumulation of errors but also because changing of the control fields may be a part of the process, which the simple copy-back cannot do. However, if updating of the control fields had been the only issue with using copy-back, it could have been resolved by adding a step of updating the control fields by the flash controller executing the flash management algorithms while the data remains in the data register of the flash die. Most flash dies that support copy-back also support such in-register updating before programming the data to its destination. Additionally, in many flash management systems it remains a fact that even though some control fields depend on the physical address of the data, many, if not most, control fields do not. Therefore it is possible to use efficient copy-back for many page copy operations, even though some page copy operations require the less efficient copy procedure described above. An example of a flash management algorithm that allows page-copy operations to be used for some of its page copying operations, if not for the error accumulation problem, is U.S. Pat. No. 6,678,785.

In the following, we ignore the issue of control fields update as the control fields issues can be solved as described above.

The prior art flash management systems offer a choice only between the options of either not using copy-back commands and wasting bus transfer time, or using copy-back commands and risking data loss.

SUMMARY OF THE INVENTION

The present invention in some embodiments relates to a system for storing data in a memory where input is through a cache, and where the data is stored with error correction. The error rate in the cache is different from the error rate in the main memory and the data is protected using standard error correction schemes. The error correction scheme is set up to cover the combined error rates of the cache and main memory so that a single read out and error correction operation can be made when the data is read out from the main memory and a simple die-internal copy back operation can be used for the copy between the cache and the main memory. Thus a full copy via the flash controller can be saved upon read out from the cache to the main memory.

According to an aspect of some embodiments of the present invention there is provided a method of storage and retrieval of data in a flash memory system, the flash memory system comprising a cache storage area of relatively high reliability, and a main storage area of relatively low reliability, the method comprising:

adding to data a level of error correction redundancy higher by a predetermined margin than that required for the cache storage area, writing the data to the cache storage area, and from the cache storage area copying the data directly to the main storage area, the predetermined margin being such as to allow subsequent error correction to compensate for errors accumulated from the cache storage area and the main storage area.

In an embodiment, the cache storage area and the main storage area are co-located on a memory die, and the copying the data directly from the cache storage area to the main storage area comprises passing the data wholly within the die.

In an embodiment, the copying the data directly from the cache storage area to the main storage area comprises passing the data therebetween without intermediate error correction processing.

In an embodiment, the area of relatively high reliability is an area defined by a first number of bits stored per cell and the area of relatively low reliability is an area defined by a second number of bits stored per cell, wherein the second number is larger than the first number.

In an embodiment, the flash memory system comprises a flash control unit separated from the cache and main storage areas by a data bus and wherein the subsequent error correction is carried out at the flash control unit.

According to a second aspect of the present invention there is provided a flash memory apparatus comprising a flash controller and a memory die, the die including a cache storage area having a relatively high reliability and a main memory storage area having a relatively low reliability, the apparatus incorporating a built-in flash die page copy operation, the flash controller comprising error correction circuitry for providing a predetermined level of error correction ability for incoming data, the predetermined level being such as to allow correction of errors accumulating from writing to the cache storage area and subsequently copying to the main storage area using the built in flash die page copy operation, such that, when data is read out to the flash controller following the copying, respectively accumulated errors are correctable.

In an embodiment, the cache storage area and the main storage area are configured on the die with a path between them wholly within the die such that the data is transferable from the cache storage area to the main storage area wholly within the die.

In an embodiment, the path wholly within the die is configured for transfer of the data without error correction.

In an embodiment, the cache storage area comprises an area defined by a first number of bits stored per cell and the main storage area comprises an area defined by a second number of bits stored per cell, the first number being smaller than the second number.

In an embodiment, the flash control unit is separated from the cache and main storage areas by a data bus and wherein the error correction is carried out externally to the die at the flash control unit.

According to a third aspect of the present invention there is provided a method of storage and retrieval of data in a flash memory system, the flash memory system comprising a cache storage area having a first reliability, and a main storage area having a second reliability lower than the first reliability, the method comprising:

a) receiving data to be stored in the storage device from an external host computer;

b) calculating error correction bits for the data;

c) storing the data with the error correction bits into the cache storage area;

d) copying the data and the parity bits from the cache storage area to the main storage area, wherein the copying comprises moving the data with the parity bits wholly within the flash die during the copying using a die internal copy operation;

e) reading the data and the parity bits from the main storage area, wherein error correction is applied as part of the reading.

In an embodiment, the cache storage area uses a first number of bits per cell, and the main storage area uses a second number of bits per cell, the second number being larger than the first number.

In an embodiment, the die internal copy operation comprises a pure data copying operation without error detection or correction.

According to a fourth aspect of the present invention there is provided a method of storage and retrieval of data in a flash memory system, the flash memory system comprising a cache storage area of relatively high reliability, and a main storage area of relatively low reliability, the method comprising:

providing data to be stored in the cache storage area with a level of error correction substantially as mandated by the relatively low reliability, and storing the data with the level of error correction in the cache, thereby to allow direct copying of the data from the cache storage area into the main storage area without compromising data recoverability despite error accumulation.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF EMBODIMENTS OF THE INVENTION

Figure 1:
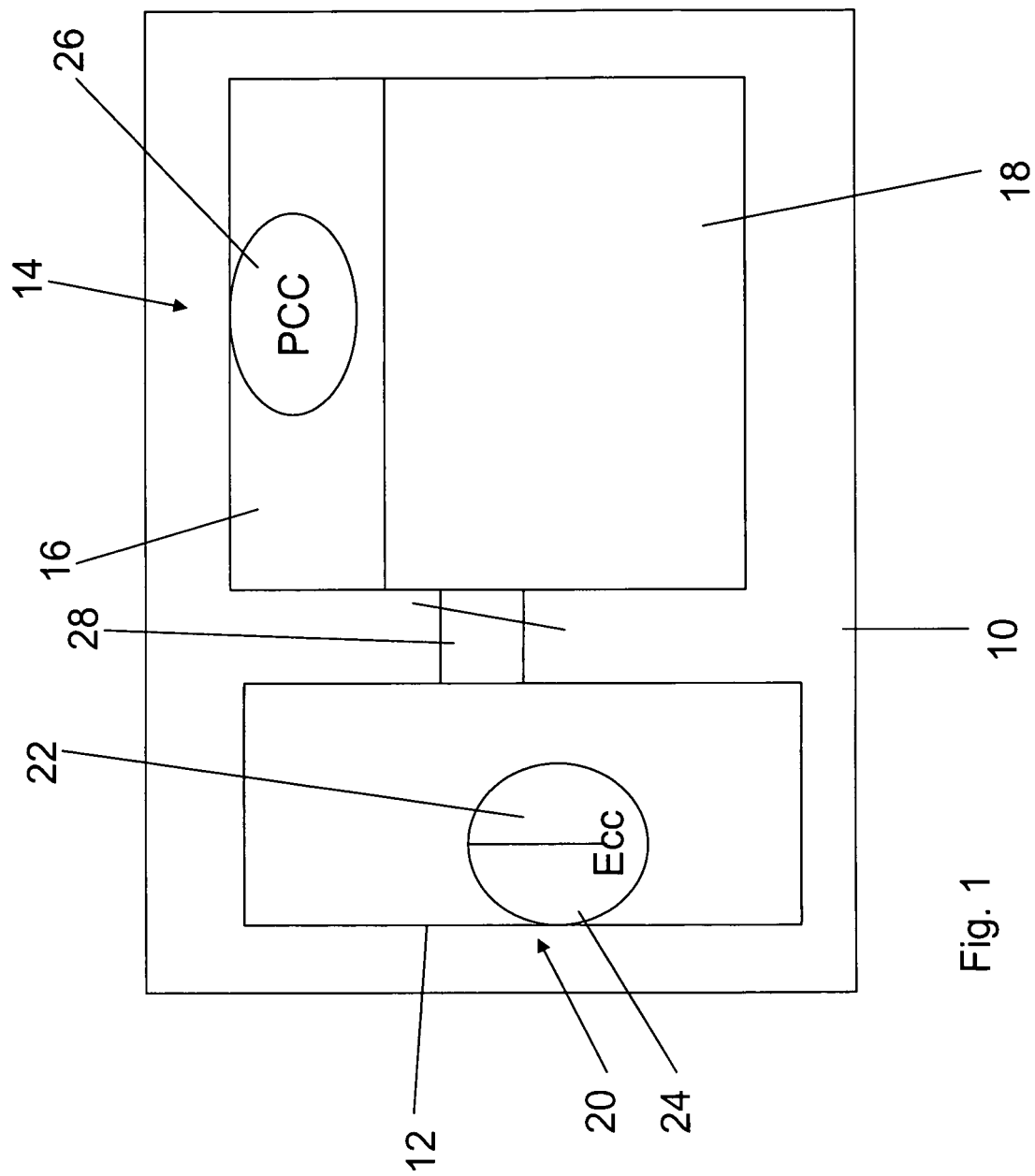
FIG. 1 is a simplified diagram showing a flash memory system suitable for use with the present embodiments.

The present invention, in some embodiments thereof, relates to error correction in copy back memory operations and, more particularly, but not exclusively, to flash and like memory devices where internal copy back operations are available but lead to accumulation of errors. Error correction is desirable to avoid accumulation of errors over a series of copy back operations, but the internal copy back operations do not provide error protection.

More specifically, the present embodiment relates to a system for storing data in a memory where input is through a cache, and where the data is stored with error correction. The error rate in the cache is different from the error rate in the main memory and the data is protected using standard error correction schemes. The error correction scheme is set up to cover the combined error rates of the cache and main memory so that a single read out and error correction operation can be made when the data is read out from the main memory and such an operation can be saved upon read out from the cache to the main memory.

The memory is typically a flash or like memory having a main area and a cache area. The insertion of error correction parity bits into the data is carried out by a flash controller which later uses the parity bits to check and correct the data as it is read out from the memory. The present embodiments increase the level of the error correction so that a data transfer operation can be carried out before the data correction has to be employed. Furthermore the data transfer may be between regions having different reliabilities. Thus some of the data transfer operations can avoid having to go via the flash controller. Thus the average time of the copy operation is reduced and the flash system bus is freed for other operations.

The flash controller includes circuitry for providing error correction parity and subsequently correcting errors thereby, at a level which is higher than the prior art systems, in order to accommodate the accumulation of errors.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Referring now to the drawings, FIG. 1 illustrates a flash memory system for use with the present embodiments. The flash memory system 10 comprises a flash controller 12, and a memory die 14. The memory die 14 comprises a cache storage area 16 of relatively high reliability, and a main storage area 18 of relatively low reliability. In general the reliability levels of the memory area are to do with the number of bits stored per cell, with lower numbers of bits per cell leading to higher reliability. The flash controller comprises error correction circuitry 20. The error correction circuitry includes an input part 22 for adding parity bits to data to be stored and an error detection and correction part 24 for using the parity bits to detect and correct errors in the data after storage.

The memory die 14 includes page copy circuitry 26 for copying data from one region to another within the memory die. The page copy circuitry 26 of the memory die does not include error correction capability; however it does include functionality to support copying between areas having different numbers of bits per cell.

As explained hereinabove, the page copy circuitry of the memory die is not much used by the prior art because it does not carry out error correction. In the absence of error correction there is error accumulation. Furthermore, when copying from an area of one level of reliability to an area of a different level of reliability a different level of error correction is needed, so that in prior art systems, data that needs to copied from the cache to main storage is initially copied back to the flash controller so that errors from the cache can be corrected and then new error correction suitable for the main storage area can be added to the data. All data being moved between the die and the flash controller typically passes over data bus 28.

Figure 2:
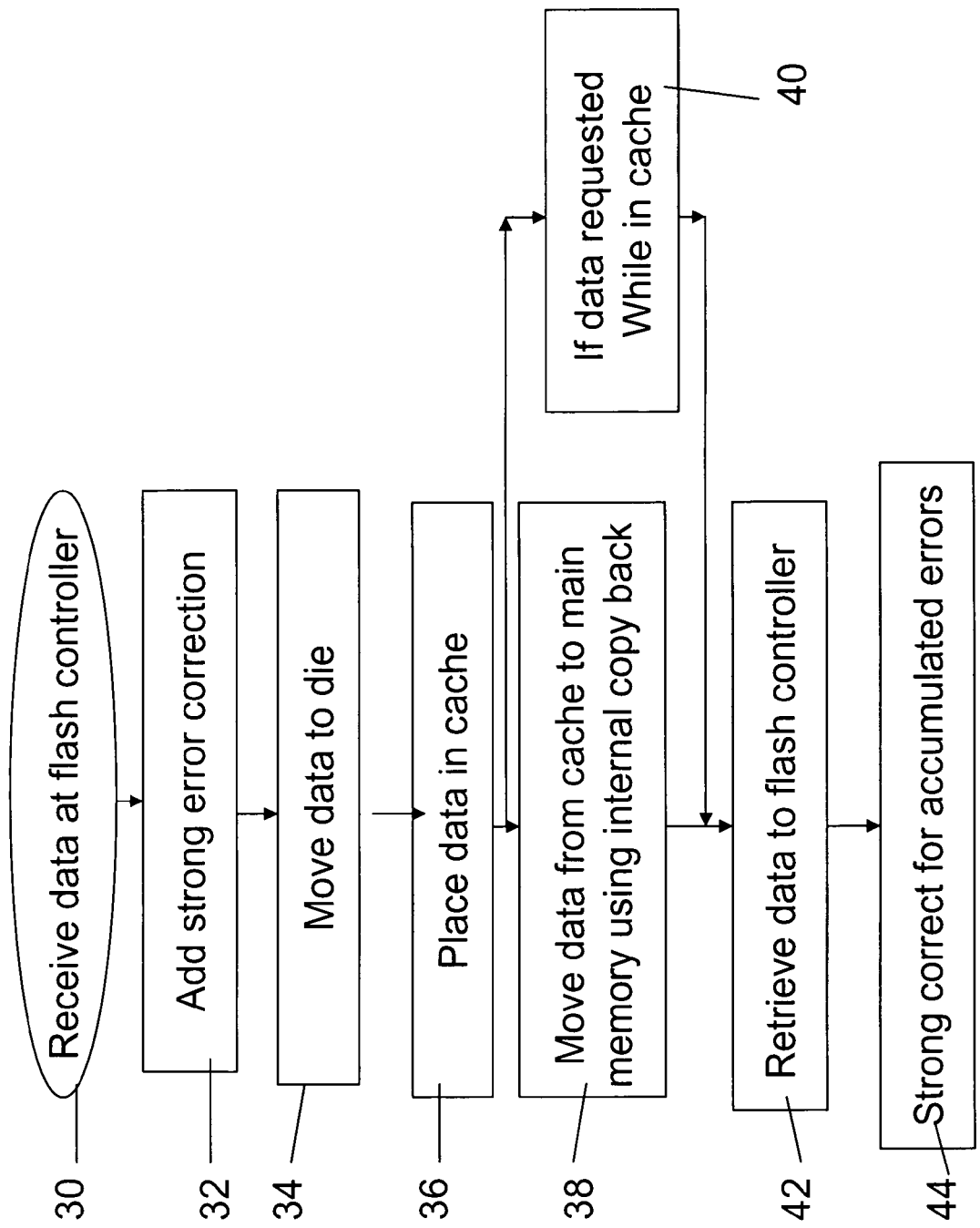
FIG. 2 is a simplified flow chart showing operation of the flash memory system of FIG. 1 in accordance with a first preferred embodiment of the present invention.

Reference is now made to FIG. 2, which illustrates a procedure for storing and retrieving data from the flash memory system 10, in accordance with a first preferred embodiment of the present invention.

Incoming data is initially received at the flash controller 12 in a stage 30. At the flash controller a level of error correction redundancy is added to the data in stage 32. The level of error correction used is selected to be sufficient for correcting errors accumulated from both the cache and the main memory.

Now it is noted that the occurrence of errors is a matter of probability. There is no such thing as knowing exactly how many errors will occur in any given unit of data. All that can be said is that a certain level of protection reduces the chances of an error getting through to a certain probability. The reliability of data storage varies according to numerous factors, the amount of time since manufacture, the amount of use, ambient temperature etc. Thus the correct level of error protection given a storage region of a certain reliability is very much a design parameter that the skilled engineer would select when designing the system. Given the same hardware he may choose different levels of protection depending on the safety critical standards of the system. Thus a card made to standards in force for controlling a railway system or a spacecraft would typically be assigned higher levels of error protection than a standard consumer product. In cases where the cost of additional protection is not high compared to the cost of designing the individual product, some manufacturers may choose to make all of their products to the higher standards.

In the present embodiment an overall level of protection is selected according to the system requirements and then the controller provides that level of protection in relation to the probable accumulation of errors due to storage in the cache area followed by the main storage area. That is to say the level of protection provided is higher by a predetermined margin than that required for storage in the cache storage area alone.

More specifically the level of protection provided as compared to the probable level of error accumulation is at least that which the skilled person would demand of a product in order to consider it a working product and fulfill the expectations of a consumer, and indeed consumer law, in terms of fitness for purpose. The level of protection is set by the combination of the two areas, and particularly by the requirements of the area of lower reliability. The level of protection is thus substantially higher than the level required by the area of higher reliability.

In stage 34 the data is moved to the memory die 14.

On the memory die the data is written to the cache storage area 16 in stage 36.

In stage 38 the data is copied directly from the cache to the main memory using the memory die's internal copy procedure, where the term "directly" means that the transfer is carried out wholly inside the die and no error correction occurs. Rather straight copying is made of the data and the parity bits of the error correction system.

In the event that external devices want the data before it is copied to the main memory then in stage 40 the data can be output back to the flash controller from the cache. In this case the error correction is still the strong correction and is very much overkill for the data that has been stored only in the highly reliable cache. However this is at no or negligible cost to the system design.

In all other cases the data is copied from the cache storage area directly to the main storage area. Then, following storage, the data is sent back over the flash system bus 28 to the flash controller 12 where strong level error correction is used to correct for errors accumulated from the cache storage area and the target area.

It will be appreciated that the cache storage area 16 and the main storage area 18 are co-located on the memory die 14, so that copying the data directly from the cache storage area 16 to the main storage area 18 comprises passing the data wholly within the die 14 and does not involve the bus 28 or the flash controller 12. Thus the internal page copy back operation can be used and no intermediate error correction processing is carried out.

The cache is an area of relatively high reliability, which means an area defined by a relatively low number of bits stored per cell. A single bit per cell is typical for a cache of this kind. The area of relatively low reliability is an area defined by a relatively higher number of bits stored per cell, at least two.

The flash memory system 10 comprises flash control unit 12, which as discussed is separated from the cache and main storage areas by data bus 28. Operations such as adding of parity bits and subsequent error correction using those parity bits, are carried out at the flash control unit.

The embodiments are now considered in greater detail. The present solution uses copy-back capabilities without risking data loss, and is applicable to a certain class of flash management copying operations, in particular to the flushing of cached data into the main storage area in a storage system where incoming host data is first cached in a temporary cache before being moved into a more permanent location, and where the cache storage uses less bits per cell than the main storage area.

Self-cached flash storage systems are known in the prior art—see for example U.S. Pat. No. 5,930,167 and U.S. patent application Ser. No. 11/318,906. In such systems a significant amount of data copying activity is carried out in order to flush the cached data, as each and every page of data sent from the host has to go through such a flushing phase when cleared from the cache to the more dense main storage area.

The present embodiments make the cache flushing activity more efficient by eliminating some of the bus transfer activities, and in particular they move the data from the cache to the main area without allowing it out of the flash die.

A point lying behind the preferred embodiments is the fact that the lower the number of bits per cell used for storage, the more reliable is the cell and the fewer errors are accumulated therein. Let us take as an example the case where the cache is operating in SLC mode (one bit per cell) and the main area is operating in a two-bits-per-cell MLC mode. The maximal number of errors per sector of 512 bytes of data that we should expect in an SLC page is typically one, even if the data is stored there for the full specified device data retention time. As for the MLC area, the maximal number of errors per sector is much higher, 4 errors being a typical case. This in turn implies that the ECC mechanism that has to be implemented for the MLC area needs much stronger error correction capability than is required for the SLC area. Because the cache area is limited to SLC, we would expect to employ a much weaker error correction scheme for the cache area, also using fewer parity bits per page than in the main area.

Figure 3:
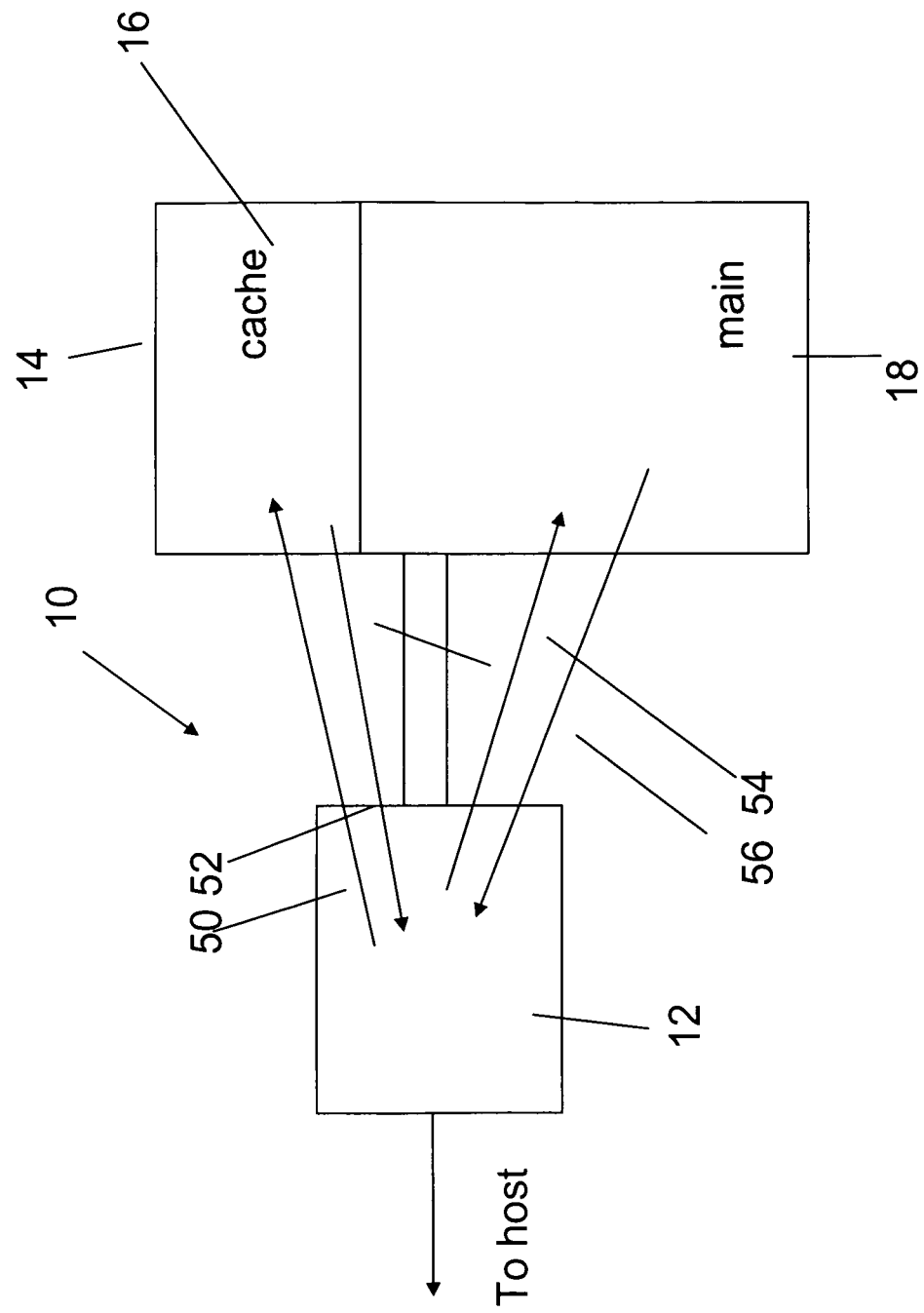
FIG. 3 is a simplified diagram showing data transfer operations mapped out over a diagram of a flash memory system according to prior art techniques.

Reference is now made to FIG. 3, which illustrates copying of data from the cache to the main memory in prior art systems. Parts that are the same as in earlier figures are given the same reference numerals and are not described again except as necessary for an understanding of the present embodiments. Data is sent initially into the cache with light error correction—arrow 50. The data is read out of the cache—arrow 52 and the storage system 10 first corrects any error in the cached data, using the light error correction mechanism. Then the system encodes the data using a stronger MLC-type error correction scheme and passes the data—arrow 54—for storing in the main area 18. This way each type of storage mode is always protected by the right level of error correction. However, in order to do this the data has to travel from the flash controller 12 to the cache, and from the cache back to the controller. Then it goes back from the flash controller to the main memory for longer term storage before finally returning to the flash controller for read out—arrow 56, making utilization of the bus relatively high and slowing the operation of the flash system.

It is noted that if no errors are detected then it is not necessary to send data from the controller to the flash since the correct version of the data is already in the data register of the flash and can be written to the main area immediately.

Figure 4:
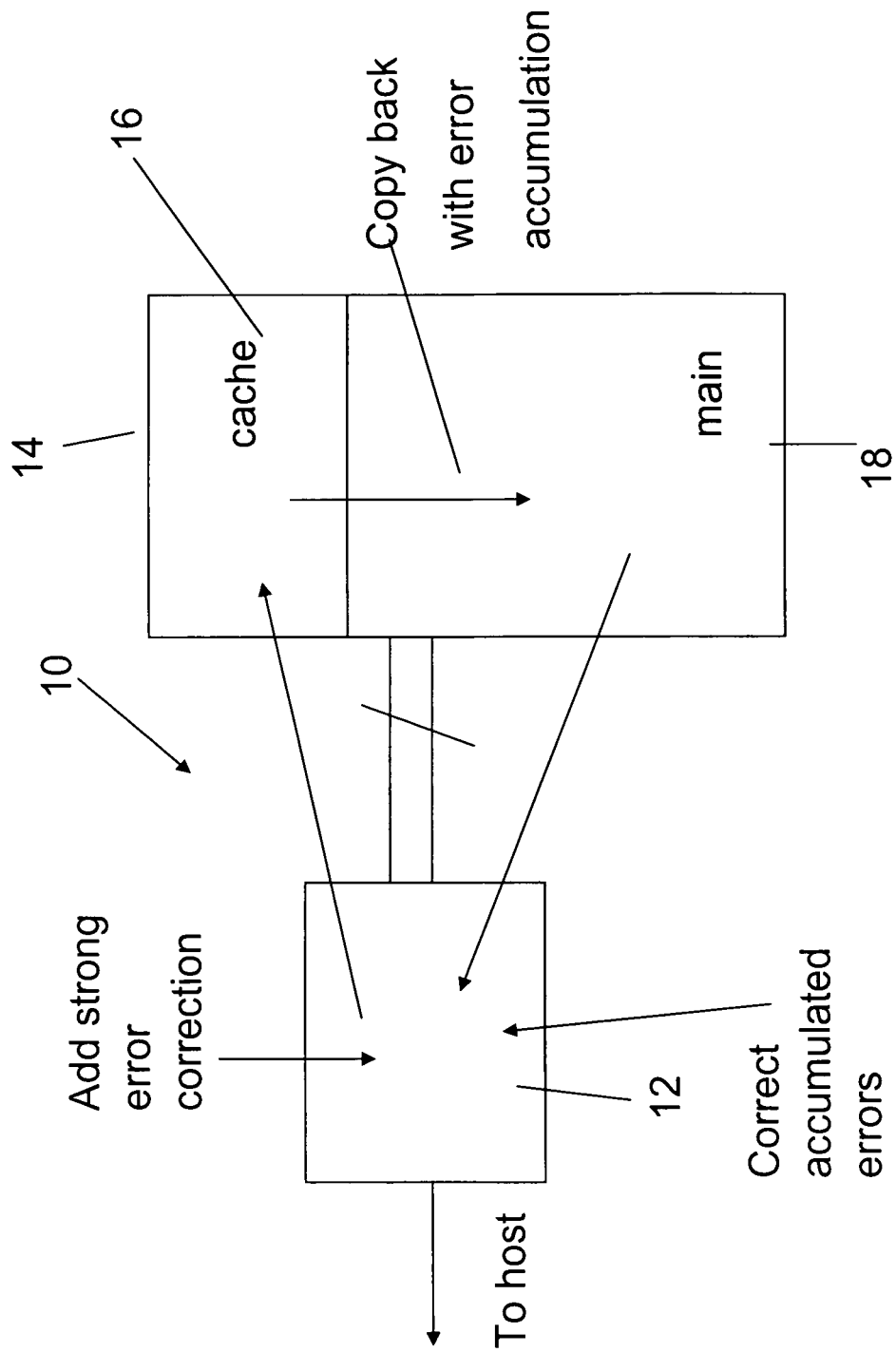
FIG. 4 is a simplified diagram showing data transfer operations mapped out over a diagram of a flash memory system according to a first preferred embodiment of the present invention.

Reference is now made to FIG. 4, which shows how the present embodiments modify the process according to the following rules—

A. Before writing data to the cache 16 it is encoded using a strong error correction scheme, even though the data is being sent for storage in a relatively reliable memory for example using SLC.

B. When flushing the data out of the cache, the copying is done using the die internal copy-back commands, straight to the main memory. Note that the operation used is a special kind of copy-back—it copies data between storage areas of different densities. This means the copying is not a one page to one page copy, but rather a multiple pages to one page copy. In the example above—two SLC pages are copied into one MLC page. While a special case of copy-back, this is no different in principle from the simple one-page to one-page copy back and is known in the prior art. Herein, a page means a physical block of cells. The page contains all the bits stored in its cells and corresponding to multiple logical pages as seen by the host.

C. No error detection or correction is carried out on the data on its way from the cache to the main memory area.

D. When later reading the data from the main area, whether per host read request or as part of other flash management activities, the strong error correction mechanism is employed.

E. The strong error correction scheme selected is, as discussed, good enough to correct the accumulation of errors in the cache and in the main area, combined. In the above example—an error correction mechanism capable of correcting 5 errors per sector is guaranteed to correct even the worst case of a page suffering one error while in the cache and an additional 4 errors while in the main area. It may be noted that when the difference in reliability between the two storage modes is high, for example when the cache is SLC and the main area is used in four-bits-per-cell mode, then the effect of the SLC errors on the cost of the ECC mechanism is negligible. In other words—adding a requirement for one additional single error on top of an already high number of correctable errors is not significant in terms of ECC complexity and cost.

If the host asks to read the data while it is still in the cache, one may simply read it out and employ the strong error correction scheme. Even though this is overkill as the cache pages are not expected to accumulate so many errors, this costs nothing more in the implementation as the strong ECC circuitry must exist anyway.

It is further noted that even though the present embodiments provide for additional parity bits in the cache pages that would not be required in the prior art solution, this again comes free. Typically all pages of the flash die have the same number of cells, regardless of whether they are used as SLC or MLC. Therefore those extra cells exist anyway in the SLC pagers of the cache and one can use them for free.

It should be noted that there are prior art flash management systems that do copy-back operations from a lower-reliability location to a higher-reliability location, without checking for errors during the copying process. For example, MLC flash devices with two bits per cell have different reliabilities for their lower and upper pages. Those MLC devices that provide copy-back capability typically do not distinguish between the two types of pages and allow both the source page and the target page to be either a lower page or an upper page. However, such MLC prior art devices use the same number of bits per cell in both source location and target location. The present embodiments by contrast use a higher number of bits per cell in the target location, compared to the source location. It is always the case in prior art flash management systems that a higher number of bits per cell mandate a stronger and more capable error correction scheme, because a higher number of bits per cell implies a significantly lower reliability. This rule does not apply to the lower and upper pages of the MLC flash devices, which, in spite of having different reliabilities, always use the same error correction scheme for both. This is because the difference in their reliabilities is not very high.

The present embodiments use what can best be described as an overkill error correction scheme when writing into a location with a low number of bits per cell, the overkill being for the purpose of supporting a later copy-back operation when the data is moved to a target location with a higher number of bits per cell and significantly lower reliability.

It is expected that during the life of a patent maturing from this application many relevant flash management, error correction and copy back schemes will be developed and the scopes of the corresponding terms are intended to include all such new technologies a priori.

The terms "comprises", "comprising", "includes", "including", "having" and their conjugates mean "including but not limited to". This term encompasses the terms "consisting of" and "consisting essentially of".

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of storage and retrieval of data in a flash memory system, the flash memory system comprising a cache storage area of relatively high reliability, and a main storage area of relatively low reliability, the method comprising:
adding to data a level of error correction redundancy higher by a predetermined margin than that required for said cache storage area,
writing said data to said cache storage area, and
from said cache storage area copying said data directly to said main storage area, said predetermined margin being such as to allow subsequent error correction to compensate for errors accumulated from said cache storage area and said main storage area.

2. The method of claim 1, wherein said cache storage area and said main storage area are co-located on a memory die, and said copying said data directly from said cache storage area to said main storage area comprises passing said data wholly within said die.

3. The method of claim 1, wherein said copying said data directly from said cache storage area to said main storage area comprises passing said data therebetween without intermediate error correction processing.

4. The method of claim 1, wherein said area of relatively high reliability is an area defined by a first number of bits stored per cell and said area of relatively low reliability is an area defined by a second number of bits stored per cell, wherein said second number is larger than said first number.

5. The method of claim 1, wherein said flash memory system comprises a flash control unit separated from said cache and main storage areas by a data bus and wherein said subsequent error correction is carried out at said flash control unit.

6. Flash memory apparatus comprising:
a flash controller, and a memory die, the memory die including a cache storage area having a relatively high reliability and a main storage area having a relatively low reliability and incorporating a built-in flash die page copy operation, wherein the flash controller comprises error correction circuitry for providing a predetermined level of error correction ability for incoming data, said predetermined level being such as to allow correction of errors accumulating from writing to said cache storage area and subsequently copying to said main storage area using said built-in flash die page copy operation, such that, when first data is read out to said flash controller following said copying, respectively accumulated errors are correctable.

7. The apparatus of claim 6, wherein said cache storage area and said main storage area are configured on said memory die with a path between them wholly within said memory die such that second data is transferable from said cache storage area to said main storage area wholly within said memory die.

8. The apparatus of claim 7, wherein said path wholly within said memory die is configured for transfer of said second data without error correction.

9. The apparatus of claim 6, wherein said cache storage area comprises an area defined by a first number of bits stored per cell and said main storage area comprises an area defined by a second number of bits stored per cell, said first number being smaller than said second number.

10. The apparatus of claim 6, wherein said flash controller is separated from said cache and main storage areas by a data bus and wherein error correction is carried out externally to said memory die at said flash controller.

11. A method of storage and retrieval of data in a flash memory system, the flash memory system comprising a flash die including a cache storage area having a first reliability and a main storage area having a second reliability lower than the first reliability, the method comprising:
 a) receiving data to be stored from an external host computer;
 b) calculating error correction bits for said data;
 c) storing said data with said error correction bits into the cache storage area;
 d) copying said data and said error correction bits from the cache storage area to the main storage area, wherein said copying comprises moving said data with said error correction bits wholly within the flash die during said copying using a die internal copy operation; and
 e) reading said data and said error correction bits from the main storage area, wherein error correction is applied as part of said reading.

12. The method of claim 11, wherein the cache storage area uses a first number of bits per cell, and the main storage area uses a second number of bits per cell, said second number being larger than said first number.

13. The method of claim 11, wherein said die internal copy operation comprises a pure data copying operation without error detection or correction.

14. A method of storage and retrieval of data in a flash memory system, the flash memory system comprising a cache storage area of relatively high reliability, and a main storage area of relatively low reliability, the method comprising:
 providing data to be stored in said cache storage area with a level of error correction substantially as mandated by said relatively low reliability, and
 storing said data with said level of error correction in said cache storage area, thereby to allow direct copying of said data from said cache storage area into said main storage area without compromising data recoverability despite error accumulation.

\* \* \* \* \*